US005361274A

United States Patent [19]

Simpson et al.

[11] Patent Number: 5,361,274

[45] Date of Patent: Nov. 1, 1994

[54] MICROWAVE DISCHARGE DEVICE WITH $TM_{NMO}$ CAVITY

[75] Inventors: James E. Simpson, Gaithersburg; Mohammed Kamarehi, Rockville; Brian Turner, Myersville; Michael G. Ury, Bethesda, all of Md.

[73] Assignee: Fusion Systems Corp., Rockville, Md.

[21] Appl. No.: 849,719

[22] Filed: Mar. 12, 1992

[51] Int. Cl.[5] .............................................. H01S 3/093

[52] U.S. Cl. ........................................ 372/72; 372/69; 372/82; 315/39; 315/248

[58] Field of Search .................... 315/39, 248; 372/82, 372/81, 69, 72, 92

[56] References Cited

U.S. PATENT DOCUMENTS

| | | | |
|---|---|---|---|
| 3,641,389 | 2/1972 | Leidigh . | |
| 3,872,349 | 3/1975 | Spero et al. . | |
| 3,911,318 | 10/1975 | Spero et al. . | |
| 4,042,850 | 8/1977 | Ury et al. . | |
| 4,504,768 | 3/1985 | Ury et al. . | |
| 4,513,424 | 4/1985 | Waynant et al. . | |
| 4,698,822 | 10/1987 | Leprince et al. . | |
| 4,749,915 | 6/1988 | Lynch et al. | 315/39 |
| 4,780,881 | 10/1988 | Zhang et al. . | |
| 4,802,183 | 1/1989 | Harris et al. . | |
| 4,876,692 | 10/1989 | Bramley . | |
| 4,890,294 | 12/1989 | Nishimae et al. . | |
| 4,954,755 | 9/1990 | Lynch et al. | 315/248 |
| 4,955,035 | 9/1990 | Gekat . | |
| 4,987,577 | 1/1991 | Seunik et al. | 372/82 |

OTHER PUBLICATIONS

Stephan Offermanns, J. Appl. Phys. 67(1), 1 Jan. 1990, pp. 115–123.

N. Marcuvitz, Waveguide Handbook, Rectangular Guides With Ridges, Sec. 8–6, pp. 399–402.

*Primary Examiner*—Léon Scott, Jr.

*Attorney, Agent, or Firm*—Pollock, Vande Sande & Priddy

[57] ABSTRACT

A microwave powered discharge device which utilizes a $TM_{NMO}$ cavity. A conductive body is positioned at a null in a discharge device which utilizes a $TM_{210}$ cavity to reduce direct coupling from the microwave coupling means, e.g., slot of the cavity. A plurality of $TM_{110}$ cavities are ganged together, and a single discharge tube extends through all of the cavities.

14 Claims, 4 Drawing Sheets

MICROWAVE DISCHARGE DEVICE WITH $TM_{NMO}$ CAVITY

The present invention is directed to an apparatus for creating and sustaining a microwave discharge.

BACKGROUND OF THE INVENTION

Microwave discharges are suitably used as microwave power light sources. The present invention is particularly suited to light sources. In a first instance the light source can be a source of incoherent optical radiation extending over a wide range, as for example a significant portion of the ultraviolet, visible, or infrared band. In a second instance the light source can be a laser. The laser may emit coherent radiation at one or plural discrete wavelengths.

Microwave lamps generally comprise a cavity formed with at least a wall surface which is substantially open mesh. A discharge envelope is provided in the cavity. A means for transferring microwave power to the cavity comprises, for example, a waveguide and a slot. A magnetron is connected via the transferring means to the cavity. Microwave energy on the order of a hundreds to thousands of watts is coupled to the cavity. The envelope contains a discharge medium, which typically includes mercury and a rare gas.

While a laser is a different type of discharge device than a lamp, a laser may also be made using a microwave powered discharge. An elongated discharge tube is disposed in relation to a means for charging the tube with microwave energy. The tube may be provided with Brewster windows at its ends to polarize the light produced by the laser. A fully reflective mirror, and a partially reflective mirror are typically located facing the ends of the tube to form an optical resonator.

For the microwave lamps and lasers for which the present invention is particularly useful, it is desirable to excite an elongated or linear discharge.

An article by Stephan Offermanns, Journal of Applied Physics, 67(1), 1 Jan. 1990, Pp. 115–123 discusses the use of a cavity in which the electric field is parallel to an elongated discharge envelope. The cavity disclosed by Offermanns is the right cylinder $TM_{010}$. If optimized for operation at 2.45 GHz which is the ISM band used in industrial microwave lamps, this cavity would measure 3.6" in diameter. Since the envelope or bulb is located on the axis of the cavity, it would be disposed within 1.6" of the coupling means, which is located at the cavity wall. At industrially useful power levels i.e. hundreds to thousands of watts, the close proximity of the coupling means to the envelope would tend to cause direct coupling from the coupling means to the discharge envelope. Such direct coupling is not uniform, but rather is strongest nearest to the slot.

Principles of microwave engineering can be used to predict a certain field distribution in a particular cavity operating in a particular mode. The inventors have discovered that in practice the actual field measured in the cavity has a component which is not accounted for according to the predicted field distribution. Additionally, the inventors have ascribed the anomalous component of the field to the radiation field directly from the coupling means. The severity of this phenomenon appears to be inversely related to the distance between the bulb and the coupling means. In summary, in microwave discharge devices that use relatively resonant cavities, there is a problem in that the coupling means, (e.g. slot) couples directly to the bulb, rather than coupling to the oscillation mode in the cavity, which then couples to the bulb. Direct coupling from the slot results in sharp peaks in discharge intensity closest to the slot.

SUMMARY OF THE INVENTION

According to the present invention a $TM_{NMO}$ cavity, where N and M are non zero integers, is used to excite an elongated discharge. Preferably N and M are on the order of 1 or 2. The cavity is at least approximately box shaped.

According to a preferred embodiment of the invention, the discharge is contained in an elongated vessel or envelope, which is positioned in the direction of the electric field, preferably at a maximum.

The $TM_{110}$ mode cavity as opposed to the higher order mode cavities has the advantage that it is the smallest. The small size facilitates making a lamp that fits within a small space. For example, sheet fed presses which require ultraviolet lamps have a small space to accommodate the lamp.

The $TM_{NMO}$ cavities have the advantage that the electric field is in a single direction, and that along any line in this direction, the field intensity is uniform. Therefore, if a linear bulb is positioned in the direction of the electric field, then the electric field acting on the bulb will be uniform in direction and magnitude along the entire length of the bulb. The inventors know of no microwave electrodeless lamp that has such a uniform excitation arrangement. It is contemplated that in such an excitation arrangement, the field will couple better to the discharge.

The $TM_{210}$ mode cavity has the advantage that it is twice as large and so the coupling means can be located farther from the discharge envelope. Another advantage is that the $TM_{210}$ mode has an electric field null at the center of the cavity. A small conductive plate can be placed directly opposite the slot at the null. The plate serves to short the direct radiation field from the slot without affecting the $TM_{210}$ oscillation which is simultaneously driven by the slot.

According to another aspect of the invention, plural $TM_{110}$ cavities are ganged together so that the electric fields of the plural cavities are co-linear. The advantage is that a long discharge tube can be excited without using a cavity that is susceptible to spurious high order mode operation.

An advantage of the invention is that a discharge is more uniformly excited.

A further advantage is that direct coupling from a coupling means, e.g., slot, is reduced.

DESCRIPTION OF THE PREFERRED EMBODIMENTS

Figure 1:
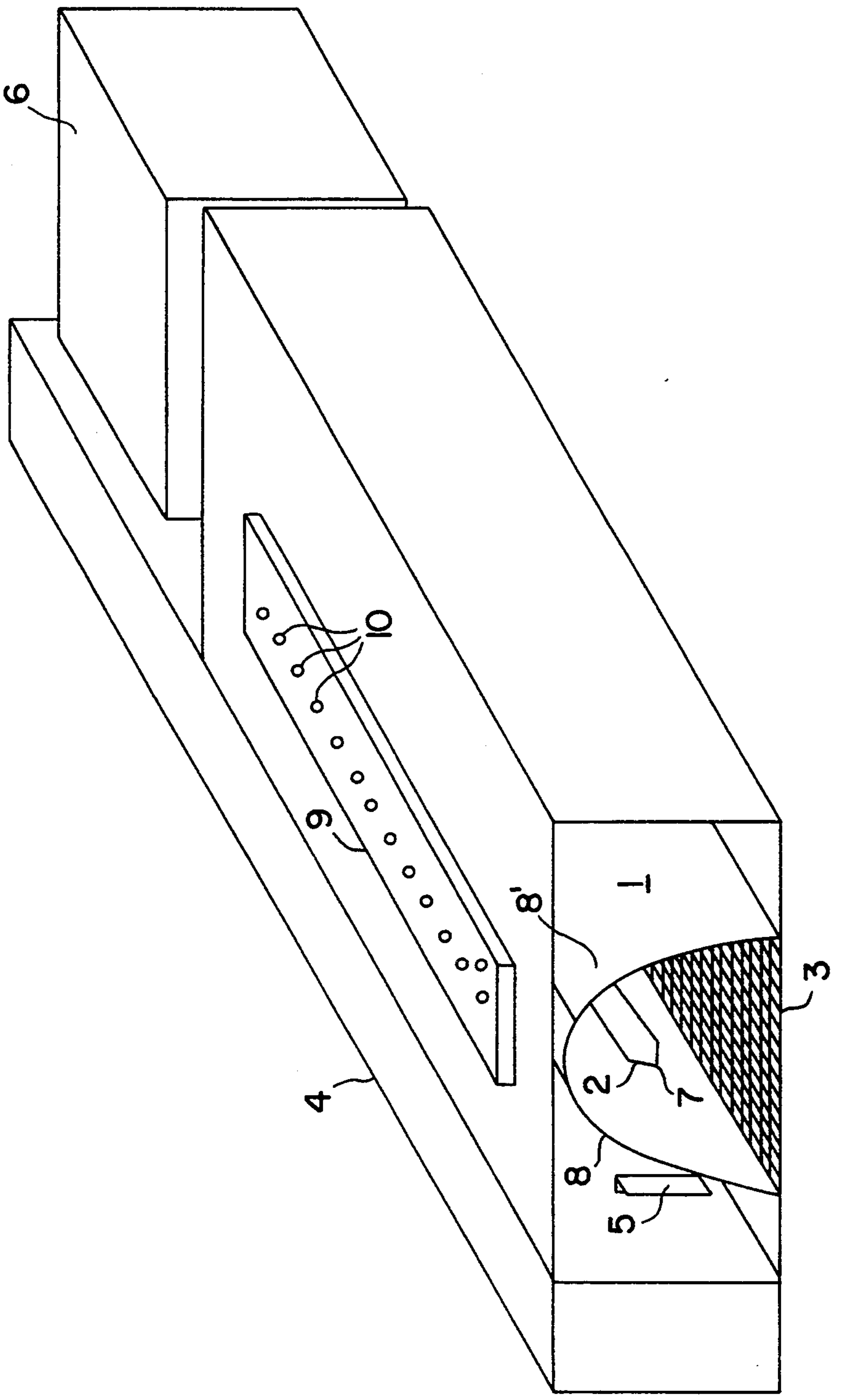
FIG. 1 shows a microwave powered lamp which utilizes a $TM_{110}$ cavity.

FIG. 1 depicts a microwave powered electrodeless lamp constructed according to the present invention.

The cavity 1 is shaped like an oblong box and is dimensioned to support a $TM_{110}$ mode of microwave oscillation. In general each of the dimensions is different and is approximated by the following equation.

$$\frac{2\pi F}{C} = \left[\left(\frac{M\pi}{a}\right)^2 + \left(\frac{N\pi}{b}\right)^2 + \left(\frac{P\pi}{d}\right)^2\right]^{\frac{1}{2}}$$

In the equation M,N, and P represent the mode order subscripts and will be 1,1, and 0 respectively for the $TM_{110}$ mode. The frequency, f is the microwave frequency which is preferably 2.45 Ghz. The parameters, a,b,d represents the inside dimensions of the cavity. By trial calculation, selecting different parameters a,b,d approximate dimensions can be found which support the $TM_{110}$ mode at the correct frequency.

Because the electric field lines are straight, the dimension of the cavity parallel to the electric field lines can be changed without affecting the frequency at which the TM110 mode is supported. The dimension which can be changed, and thus can be chosen to accommodate different bulb sizes for different applications.

When the discharge bulb 2 is lit, especially in the case of a higher pressure lamp type bulb, it acts like a conductor. The bulb 2 is best placed at the position of peak field intensity in the cavity 1. The presence of the bulb 2 modifies the fields of the cavity 1. This calls for slight modification from the value predicted by the equation of at least one of the two dimensions of the cavity perpendicular to the field direction. In determining the appropriate modified value, one wall, which is preferably the wall opposite the waveguide will be made movable by installing it with spring finger gasketing around its periphery, contacting the adjacent walls of the cavity. A position of the movable wall will be selected such that the lamp starts and runs favorably. The exact position is a compromise between starting and running requirements. Manufactured lamps will have walls fixed at the position found by experimentation.

Dimensions of 8.6" by 5.0" by 3.4" have been found to work well. The electric field and the bulb were aligned along the longest dimension of the cavity. The height of the cavity is small. This makes the lamp suitable for applications where the lamp must have a low profile to fit in the space provided, for example, sheet fed presses.

A central region of the lower large wall is made of woven wire mesh 3. For example, a weave of 0.030" wire at a rate 20 per inch in the weft and the warp has an open area of over 80%. This mesh allows transmission of optical radiation while containing microwave radiation.

A waveguide 4 is joined to the cavity 1 so that on one of the wide sides of the waveguide, it joins to one of the narrow sides of the cavity 1. The waveguide 4 is preferably WR340 and is operated in the $TE_{10}$ mode. This waveguide 4 may be 3.4" wide and will match the narrow side of the cavity 4 in width.

At least one coupling iris, e.g. slot 5 is made between the waveguide 4 and the cavity. Preferably two couplings slots 5 are cut one wavelength apart relative to the signal in the waveguide 4 and symmetrically positioned relative to the cavity 1 (one seen in FIG.). Such an arrangement tends to further diminish any peaks in the electric field due to radiation from the slots 5.

Since the waveguide width is chosen to match the height of the cavity, another way besides adjusting the width must be found to adjust the wavelength of the signal in the waveguide so that the slots 5 are one wavelength apart. A ridge in the waveguide serves this purpose. It is well known that the wavelength of a microwave signal in a ridge type waveguide varies with the dimensions of the ridge.

Figure 4:
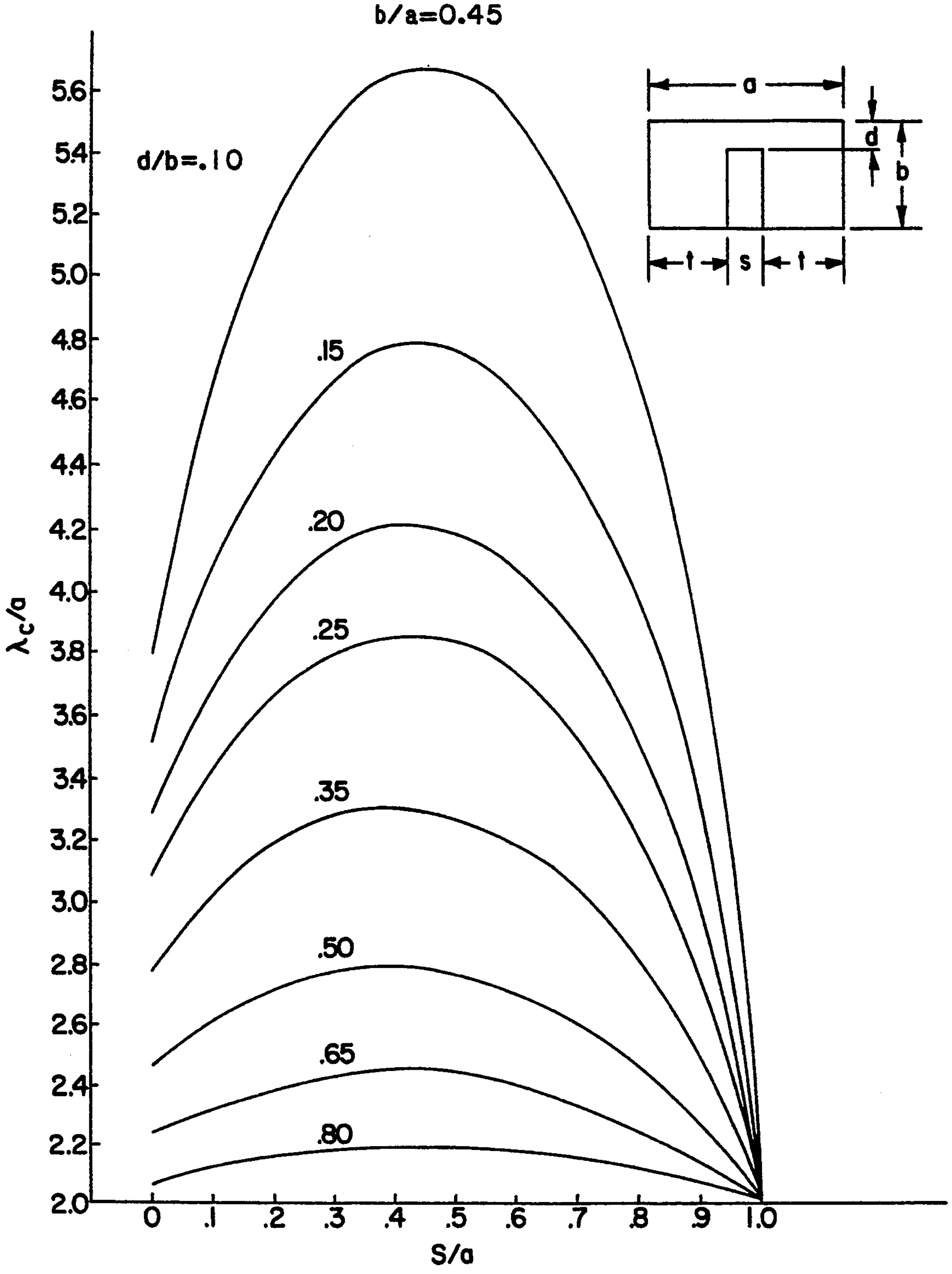
FIG. 4 is a chart showing the relationship of ridge width to cutoff wavelength for a ridged waveguide.

FIG. 4 is a chart taken the 1966 Microwave Engineer's Handbook And Buyers Guide. The chart shows the relation between the dimensions of the ridge. The following formula gives the wavelength of the signal in the guide $\lambda_g$ in terms of the free space wavelength $\lambda$ and the cutoff wavelength $\lambda_c$.

$$\lambda_g = \frac{\lambda}{\sqrt{1 - \left(\frac{\lambda}{\lambda_c}\right)^2}}$$

Using the chart and the formula, the dimension of the ridge can be selected to give one wavelength spacing between the slots. The dimension for the embodiment shown in FIG. 1 are ½" wide and ⅝" high. Section 8.6 of *Waveguide Handbook* by N. Marcuvitz, 1951 McGraw Hill which treats ridged waveguides is incorporated herein by reference.

The waveguide 4 need not attach to the side. To minimize the width of the lamp, the waveguide 4 could be attached to the top but this would increase the height. Likewise the waveguide 4 could be attached at the end.

A magnetton 6 is attached to the waveguide 4 at the end which is remote from the cavity 1. The magnetron 6 supplies energy at 2.45 GHz to the lamp. The power of the magnetron 6 is preferably from 500 watts to 3000 watts.

Alternatively, microwave power can be fed to the lamp through a flexible coaxial cable. The advantage of using coaxial cable is that the microwave power source could be located away from the lamp in the optimum position for the particular industrial installation. Probe or loop type coupling arrangements are available for coupling coaxial cable to cavities.

The discharge envelope 2 is a quartz tube closed at both ends and containing a fill as described in the background section of this specification. The envelope 2 has small tips 7 which are useful to support it. The envelope 2 may be supported by the tips 7 in small holes in the cavity wall (not shown). The envelope is located at the center of the cavity 1.

A two piece reflector 8,8' is situated so as to capture and direct the radiation emitted by the bulb 2. The reflector parts 8,8' are made of a dielectric material such as quartz or pyrex so that they do not interfere with the microwave oscillation in the cavity 1.

The reflector parts 8,8' can be shaped as sections of an elliptical cylinder and positioned so that their first focus corresponds to the location of the bulb. Accordingly, optical radiation emitted by the bulb will by focused on a line corresponding to a second focus. The lamp will be positioned such that the second focus corresponds to the position through which material to be treated passes. The material could be a web or a sheet bearing an ultraviolet curable ink.

To enhance the reflection the reflectors 8,8' are preferably provided with reflective coatings on their surface which faces the bulb. For example, such a coating may be a dielectric interference stack comprised of alternate ¼ optical thickness layers of silicon dioxide and hafnium dioxide. The interference stack is preferably designed to reflect primarily ultraviolet and transmit infrared radiation.

A low profile plenum 9 is provided on top of the cavity 1 above the position of the bulb 2. One or more rows of orifii 10 are provided from the plenum through the cavity wall into the cavity 1. Pressurized air is delivered to the plenum 9 and flows through the orifii 10. The streams of air pass through the separation between the reflectors 8,8' and impinge the bulb.

Instead of a microwave cavity made of solid conducting material and an interior dielectric reflector, it is possible to use a cavity which is made substantially entirely of mesh and an exterior reflector. Both arrangements allow the shape of the microwave cavity to be controlled independently of the shape of the reflector.

Figure 2:
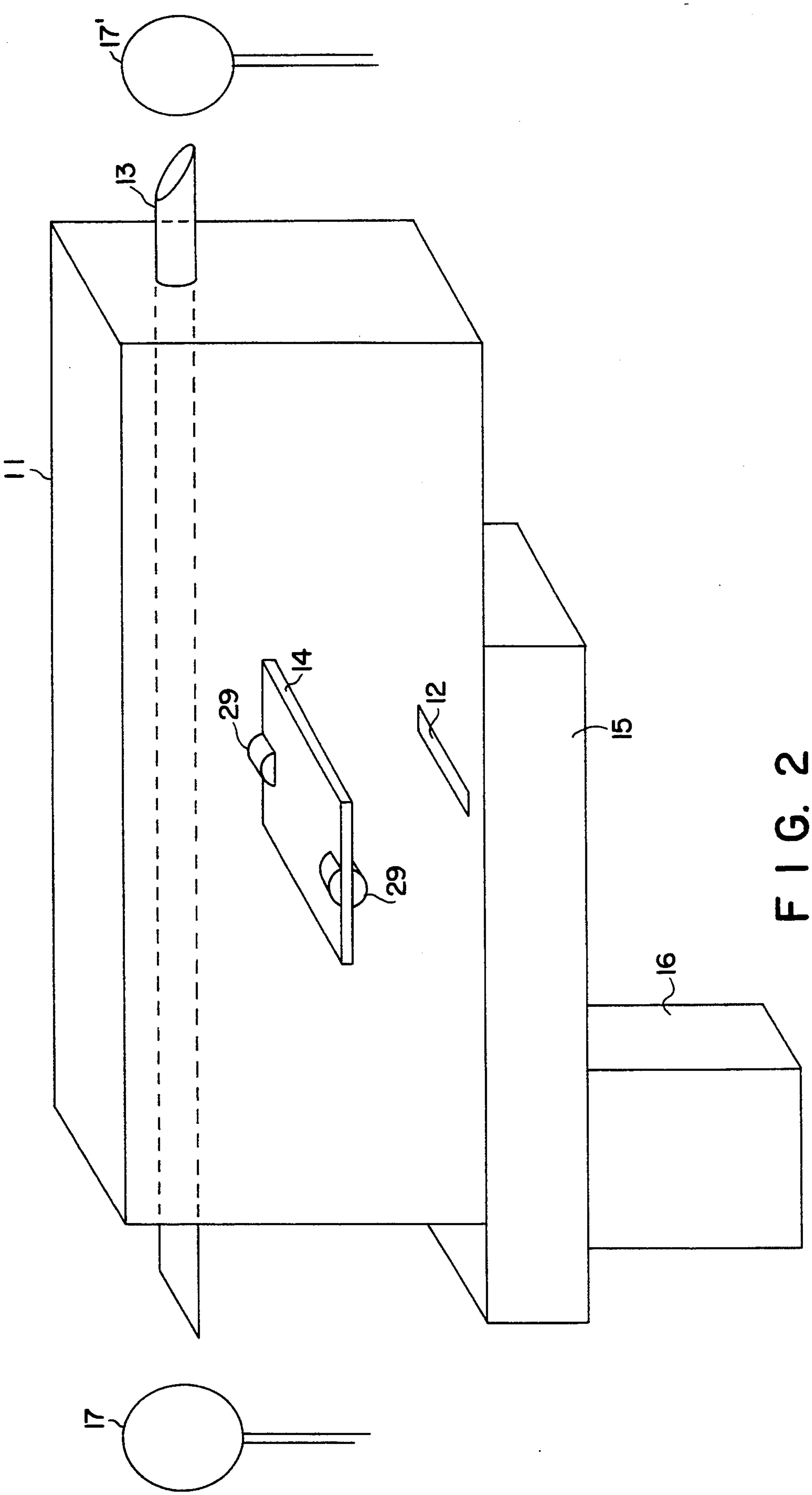
FIG. 2 shows a microwave powered laser which utilizes a $TM_{210}$ cavity.

FIG. 2 depicts a microwave powered laser. The cavity 11 is sized to support a $TM_{210}$ mode. The proper dimensions can be determined using the equation as a guide and experimentation with a movable wall as described in connection with the first embodiment.

The following particular arrangement was found to work well. The cavity 11 was a box measuring 8.75"×3.4"×6.8" in length, width and height respectively. A slot 12 which measures 2.5"×0.5" was located in the bottom wall (3.4"×8.75" wall). The slot 12 was centered with respect to the wall and oriented with its 2.5" length aligned parallel to the 3.4" width of the wall. The electric field in the cavity 11 was confined in direction to be parallel to the length (8.75") of the cavity 11. The discharge envelope 13, which in this case is a laser discharge tube 13, was located parallel to the length of the cavity, midway along the width, and 5.1 inches above the bottom wall of the cavity 11 at a maximum in the electric field intensity. A metal plate 14 was located at the center of the cavity. The function of the plate is described below.

As shown, the metal plate does not touch the walls of the cavity. It is suspended by opposed teflon buttons 29 from the side walls of the cavity. In alternative embodiments, the plate may touch the wall. It is not expected that the plate touching the wall will disrupt the microwave oscillation since it is positioned at the null.

When microwave energy is coupled through the slot 12 at 2.45 Ghz the above described geometry supports the desired $TM_{210}$ microwave mode.

The $TM_{210}$ mode is different than the $TM_{110}$ in that along one axis perpendicular to the field orientation there are two opposite maxima in electric field with an interceding null, whereas in the TM110 there is only one centrally located maximum in the electric field along either axis normal to the field orientation.

Since the plate 14 is located at the null of the electric field of the $TM_{210}$ pattern its affect on the microwave oscillation in that mode is minimal. However, the plate 14 serves the important function of shorting direct radiation from the slot 12. The direct radiation from the slot 12 that affects the laser discharge tube 13 is minimized by the inclusion of the plate 14. The optimal size of the plate 14 is found by experiment. In the particular embodiment of FIG. 2, a plate 14 which measured 1.25"×2.5"×1.34" was arranged in the cavity 11 with its 2.5" length parallel to the slot, and parallel to the bottom wall.

A waveguide 15 extends along the bottom wall of the cavity 11 a short distance past its center whereat the slot 12 is located. The opposite end of the waveguide extends past the bottom wall of the cavity 11. A magnetron 16 which generates 500 to 3000 watts of power at 2.45 GHz is connected to the bottom of the waveguide 15, at the end that extends past the cavity 11.

The laser discharge tube 13 is long enough so that it extends outside of the cavity 11 through holes in the end walls (walls which measure 3.4"×6.8"). The laser discharge tube may comprise any of various known laser media, the choice of which depends on the choice of wavelength of light to be produced. Various known media such as helium-neon, or carbon dioxide are possible.

Opposed mirrors 17,17' are arranged facing the ends of the laser discharge tube 13 from outside of the cavity 11. One mirror is totally reflective whereas the other is partially reflective.

The $TM_{110}$ mode is ostensibly independent of the length of the cavity. That is, it might be expected that the cavity could be extended indefinitely in the direction of the electric field without upsetting the mode. However, as the length is increased approaching 1 meter the probability that the dimensions of the cavity could support other spurious modes increases. Although a cavity could be made relatively long on the order of a meter, to excite a discharge tube a meter long, malfunctioning in form of mismoding in the cavity might arise.

Figure 3:
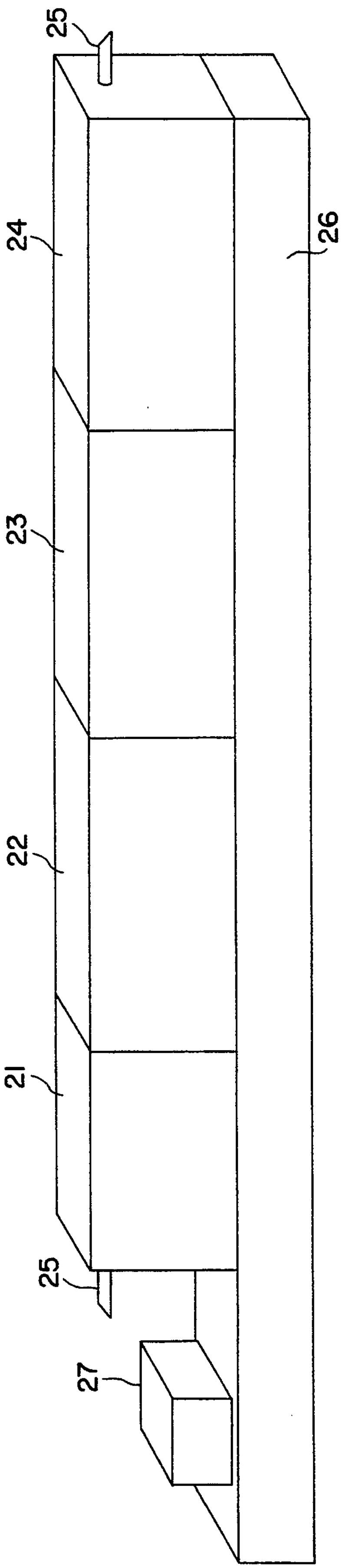
FIG. 3 shows a microwave powered laser comprising four $TM_{110}$ cavities which are ganged together.

FIG. 3 shows an embodiment which addresses the above mentioned problem. Four cavities 21–24 are ganged together to excite a single laser discharge tube 25.

Each cavity 21–24 has the same dimensions as the cavity shown and described in connection with FIG. 1. The cavities are siamesed at the end walls (walls measuring 5.0"×3.4"). Coaxial holes are drilled through the center of the end walls of the set of cavities. A 1 meter laser discharge tube 25 is positioned through the holes and extends slightly outside the set of cavities.

A single waveguide 26 is used to supply microwave power to all four of the cavities 21–24 of the set. The waveguide 26 extends from beyond the end of the first, along the bottom of the cavities 21–24. Coupling slots are provided between the center of each cavity and the waveguide. The size of the coupling slots is on the order of the slot described in connection with the above embodiments, however in order to avoid attenuation of the microwave signal reaching each successive slot, the length of each successive slot is increased compared to the adjacent slot closer to the magnetron. All of the slots may be 0.5" wide, while the lengths of the slots may be 1.5, 1.66, 1.83, 2.0 inches.

The magnetron 27 is connected to waveguide beyond the end of the set of cavities. Brewster windows at the ends of the discharge tube and laser mirrors arranged about the tube are provided as described in connection with FIG. 2.

There thus has been provided a new and improved discharge device. Inasmuch as the present invention is subject to many variations, modifications, and changes in detail, it is intended that all matter described throughout this specification as shown in the accompanying drawings be interpreted as illustrative only and not in a limiting sense. Accordingly, it is intended that the invention be limited only by the spirit and scope of the appended claims.

What is claimed is:

1. A microwave powered electrodeless lamp comprising, a discharge envelope, means for generating microwave energy, a microwave cavity including microwave coupling means situated at a wall of the cavity for coupling said microwave energy to said cavity, said coupling means comprising means for coupling both an oscillating microwave field having a mode of oscillation which has a null in microwave field strength in said cavity at a particular position in front of said coupling means, and a direct microwave field, to said cavity, a conductive body located in said cavity at said particular position in front of said coupling means where said null occurs so as to short said direct microwave field while not affecting said oscillating microwave field, said discharge envelope being located on the opposite side of said conductive body from said coupling means.

2. An apparatus according to claim 1 wherein said mode is a $TM_{210}$ mode and said cavity is box-shaped.

3. An apparatus according to claim 2 wherein said coupling means is a coupling slot and said conductive body is flat piece of metal which is positioned in a plane parallel to the plane of the coupling slot.

4. A microwave powered electrodeless lighting device comprising, an elongated discharge envelope, means for generating microwave energy, a plurality of linear cavities, each of which has a longitudinally extending cavity wall structure which extends in a longitudinal direction and end walls which are perpendicular to said longitudinally extending cavity wall structure, means for coupling said microwave energy to each said cavities, such that each cavity during operation contains an electric field which extends parallel to said longitudinal direction, said plurality of cavities being joined together end wall to end wall so that the electric fields in the respective cavities are oriented in the same direction, a series of concentric holes drilled through the respective end walls of said plurality of cavities, and said elongated discharge envelope extending through said holes so as to extend the complete length of said plurality of cavities.

5. A device according to claim 4 wherein each of said plurality of cavities is a $TM_{110}$ cavity.

6. A device according to claim 4 wherein said elongated discharge envelope is a laser discharge tube.

7. A device according to claim 6 wherein each of said plurality of cavities is a $TM_{110}$ cavity.

8. A microwave powered lamp comprising, a cavity sized and shaped approximately to support a $TM_{NM0}$ mode, where M and N are non zero integers, when microwave power at a predetermined frequency is coupled to said cavity, a source of microwave power at said predetermined frequency, means for coupling said microwave power at said predetermined frequency from said source to said cavity, and a discharge envelope located in said cavity.

9. A lamp according to claim 8 wherein said discharge envelope is elongated in shape and is disposed in said cavity in the direction of the electric field in said cavity and at a position where the electric field is at a maximum.

10. A lamp according to claim 9 wherein said means for transferring microwave power from said source to said cavity comprises a waveguide and a coupling iris, and said source of microwave power comprises a magnetron which is connected to said waveguide at an end remote from said cavity.

11. A lamp according to claim 8 wherein said mode is $TM_{110}$ or $TM_{210}$.

12. A microwave powered lamp comprising, a box-shaped cavity extending in a long direction which is sized and shaped approximately to support a $TM_{NM0}$ mode, where M and N are non zero integers, when microwave power at a predetermined frequency is coupled to said cavity, a source of microwave power at said predetermined frequency, means for coupling microwave power at said predetermined frequency from said source to said cavity for establishing an electric field in said cavity which extends parallel to said long direction and an elongated discharge envelope in said cavity which is oriented in said long direction.

13. A lamp according to claim 12 wherein a dielectric reflector is disposed in said cavity.

14. A lamp according to claim 12 wherein said cavity is made substantially entirely of mesh.

* * * * *